(12) United States Patent
Solbach

(10) Patent No.: US 11,303,991 B2
(45) Date of Patent: *Apr. 12, 2022

(54) BEAMFORMING USING AN IN-EAR AUDIO DEVICE

(71) Applicant: Amazon Technologies, Inc., Seattle, WA (US)

(72) Inventor: Ludger Solbach, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 161 days.

This patent is subject to a terminal disclaimer.

(21) Appl. No.: 16/686,786

(22) Filed: Nov. 18, 2019

(65) Prior Publication Data

US 2020/0100018 A1 Mar. 26, 2020

Related U.S. Application Data

(63) Continuation of application No. 16/142,992, filed on Sep. 26, 2018, now Pat. No. 10,516,934.

(51) Int. Cl.
*H04R 1/10* (2006.01)
*G06F 3/16* (2006.01)
(Continued)

(52) U.S. Cl.
CPC .......... *H04R 1/1083* (2013.01); *G06F 3/167* (2013.01); *G10L 21/0232* (2013.01);
(Continued)

(58) Field of Classification Search
CPC ...... H04N 7/181; H04N 19/129; H04N 19/61; G10L 21/0208; G10L 21/0232; G10L 2021/02166; G10L 2021/02082; G10L 2021/02165; G10L 21/0364; G10L 25/21; G10L 15/08; G10L 15/22;
(Continued)

(56) References Cited

U.S. PATENT DOCUMENTS 9,237,392 B2 * 1/2016 Asada .................... G10L 25/84
10,516,934 B1 * 12/2019 Solbach ............. G10L 21/0232
(Continued)

FOREIGN PATENT DOCUMENTS

EP        2790416 A1    10/2014
KR     101149981 B1      5/2012

OTHER PUBLICATIONS

Nakamura, International Preliminary Report on Patentability issued in International Patent Application No. PCT/US2019/046749, dated Apr. 8, 2021, 7 pages.

*Primary Examiner* — Lun-See Lao
(74) *Attorney, Agent, or Firm* — Pierce Atwood LLP

(57) ABSTRACT

A beamformer system includes an in-ear audio device, such as an earbud, that has three microphones. Two microphones may be disposed on an external face of the audio-device; one microphone may be disposed in or near the ear canal of a user. Data from two microphones is phase-adjusted and combined; a reference signal is generated by phase-adjusting and removing data from the two microphones from data from a third microphone. The combined data is filtered using the reference signal to remove any residual echo, and the resulting data may be used for communications, speech processing, or other uses.

19 Claims, 13 Drawing Sheets

(51) Int. Cl.
  *G10L 21/0232* (2013.01)
  *H04R 1/40* (2006.01)
  *H04R 3/00* (2006.01)
(52) U.S. Cl.
  CPC ......... *H04R 1/1016* (2013.01); *H04R 1/1041* (2013.01); *H04R 1/406* (2013.01); *H04R 3/005* (2013.01); *H04R 2420/07* (2013.01); *H04R 2430/01* (2013.01)
(58) Field of Classification Search
  CPC ......... G10L 2015/088; G10L 2015/223; G10L 2021/02163; G10L 21/0216; G10L 21/0264; G10L 21/0272; G10L 21/038; G10L 25/51; G10L 25/84; H04R 1/406; H04R 3/005; H04R 1/1016; H04R 1/1041; H04R 1/1083; H04R 2410/05; H04R 2420/07; H04R 2430/01; H04R 2430/23; H04R 1/08; H04R 1/32; H04R 1/46; H04R 2201/107; H04R 2201/401; H04R 2410/01; H04R 2499/13; H04R 2499/15; H04R 3/002; H04R 3/02; G10K 11/178; G10K 11/346; G10K 2210/511; H04B 17/26; H04B 17/336; H04B 7/015
  USPC ......... 381/74, 92, 66, 1, 94.1–94.7, 93, 122; 700/94
  See application file for complete search history.

(56) References Cited

U.S. PATENT DOCUMENTS

| | | | |
|---|---|---|---|
| 2009/0010444 A1* | 1/2009 | Goldstein | H03G 3/342 381/66 |
| 2009/0010450 A1* | 1/2009 | Burnett | G10L 21/0208 381/92 |
| 2013/0003983 A1* | 1/2013 | Hata | G10K 11/17857 381/71.6 |
| 2018/0270565 A1* | 9/2018 | Ganeshkumar | H04R 3/005 |

* cited by examiner

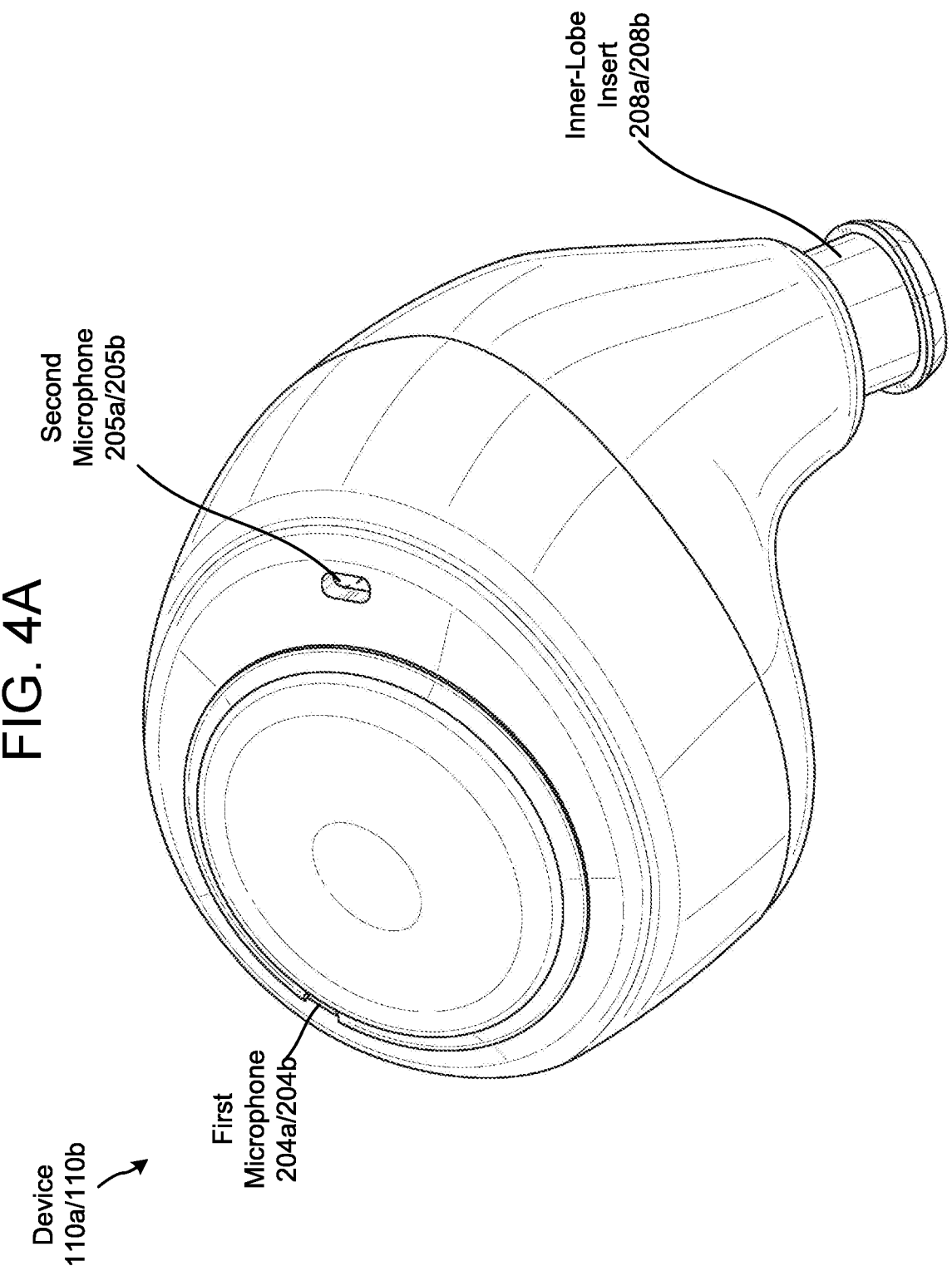

BEAMFORMING USING AN IN-EAR AUDIO DEVICE

CROSS-REFERENCE TO RELATED APPLICATION

This application is a continuation of, and claims the benefit of priority of, U.S. Non-provisional patent application Ser. No. 16/142,992, filed Sep. 26, 2018, and entitled "BEAMFORMING USING AN IN-EAR AUDIO DEVICE", the contents of which are expressly incorporated herein by referenced in its entirety.

BACKGROUND

In audio systems, beamforming refers to techniques that are used to isolate audio from a particular direction. Beamforming may be particularly useful when filtering out noise from non-desired directions. Beamforming may be used for various tasks, including isolating voice commands to be executed by a speech-processing system.

BRIEF DESCRIPTION OF DRAWINGS

For a more complete understanding of the present disclosure, reference is now made to the following description taken in conjunction with the accompanying drawings.

FIGS. 4A, 4B, and 4C illustrate various views of devices for beamforming an audio signal received from first, second, and third microphones according to embodiments of the present disclosure.

DETAILED DESCRIPTION

Figure 1:
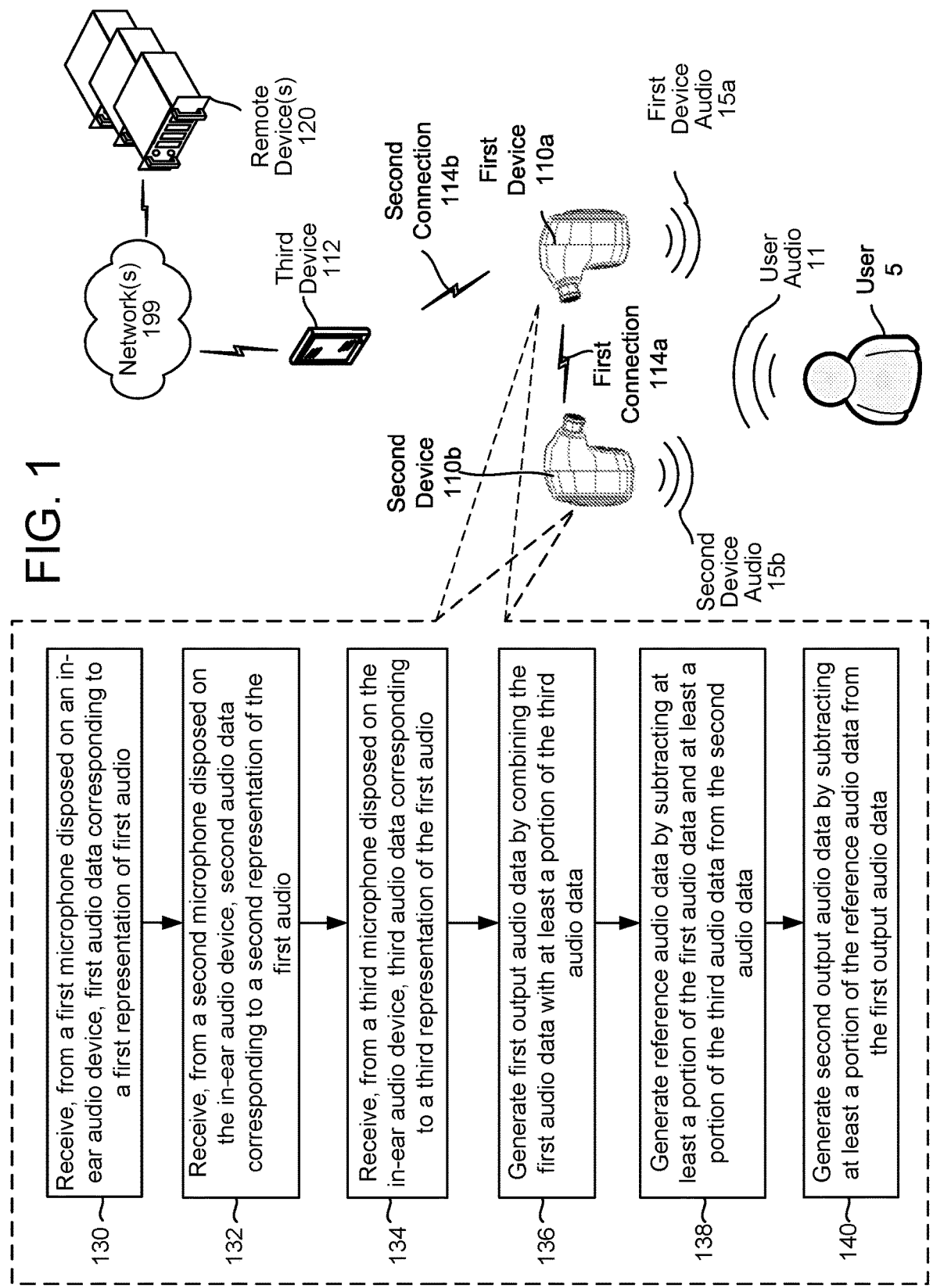
FIG. 1 illustrates a system for beamforming an audio signal received from first, second, and third microphones according to embodiments of the present disclosure.

Some electronic devices may include an audio-based input/output interface. A user may interact with such a device—which may be, for example, a smartphone, tablet, computer, or other speech-controlled device—partially or exclusively using his or her voice and ears. Exemplary interactions include listening to music or other audio, communications such as telephone calls, audio messaging, and video messaging, and/or audio input for search queries, weather forecast requests, navigation requests, or other such interactions. The device may include one or more microphones for capturing voice input and hardware and/or software for converting the voice input into audio data. As explained in greater detail below, the device may further include hardware and/or software for analyzing the audio data and determining commands and requests therein and/or may send the audio data to a remote device for such analysis. The device may include an audio output device, such as a speaker, for outputting audio that in some embodiments responds to and/or prompts for the voice input.

Use of the above-described electronic device may, at times, be inconvenient, difficult, or impossible. Sometimes, such as while exercising, working, or driving, the user's hands may be occupied, and the user may not be able to hold the device in such a fashion as to effectively interact with the device's audio interface. Other times, the level of ambient noise may be too high for the device to accurately detect speech from the user or too high for the user to understand audio output from the device. In these situations, the user may prefer to connect headphones to the device. As the term is used herein, "headphones" may refer to any wearable audio input/output device and includes headsets, earphones, earbuds, or any similar device. For added convenience, the user may choose to use wireless headphones, which communicate with the device—and optionally each other—via a wireless connection, such as Bluetooth, WI-FI, near-field magnetic induction (NFMI), LTE, or any other type of wireless connection.

In the present disclosure, for clarity, headphone components that are capable of wireless communication with both a third device and each other are referred to as "wireless earbuds," but the term "earbud" does not limit the present disclosure to any particular type of wired or wireless headphones. The present disclosure may further differentiate between a "right earbud," meaning a headphone component disposed in or near a right ear of a user, and a "left earbud," meaning a headphone component disposed in or near a left ear of a user. A "primary" earbud communicates with both a "secondary" earbud, using a first wireless connection (such as a Bluetooth connection); the primary earbud further communicates with a third device (such as a smartphone, smart watch, or similar device) using a second connection (such as a Bluetooth connection). The secondary earbud communicates directly with only with the primary earbud and does not communicate using a dedicated connection directly with the smartphone; communication therewith may pass through the primary earbud via the first wireless connection.

The primary and secondary earbuds may include similar hardware and software; in other instances, the secondary earbud contains only a subset of the hardware/software included in the primary earbud. If the primary and secondary earbuds include similar hardware and software, they may trade the roles of primary and secondary prior to or during operation. In the present disclosure, the primary earbud may be referred to as the "first device," the secondary earbud may be referred to as the "second device," and the smartphone or other device may be referred to as the "third device." The first, second, and/or third devices may communicate over a network, such as the Internet, with one or more server devices, which may be referred to as "remote device(s)."

Wireless earbuds, which communicate wirelessly not only with a third device (such as a mobile device, tablet, etc.) but with each other, may be more desirable and/or convenient to users because the earbuds do not require a wire or cord connecting them; such a cord may be distracting and/or uncomfortable. The lack of a connecting cord means, however, that each earbud requires its own power source, such as a battery, and that the power source is necessarily limited. Because the primary earbud maintains two wireless connections (one with the secondary earbud and one with the third device), it may consume power more quickly than the secondary earbud and therefore run out of battery power more quickly. Cessation of communications may be inconvenient to the user, such as if music being output by the earbuds ceases, or may be more than inconvenient if, for example, the user was engaged in an important telephone call or relying on audio navigation directions.

Beamforming systems isolate audio from a particular direction in a multi-directional audio capture system. As the terms are used herein, an azimuth direction refers to a direction in the XY plane with respect to the system, and elevation refers to a direction in the Z plane with respect to the system. One technique for beamforming involves boosting target audio received from a desired azimuth direction and/or elevation while dampening noise audio received from a non-desired azimuth direction and/or non-desired elevation. Existing beamforming systems, however, may perform poorly in noisy environments and/or when the target audio is low in volume; in these systems, the audio may not be boosted enough to accurately perform additional processing, such as automatic speech recognition (ASR) or speech-to-text processing.

In various embodiments of the present disclosure, a beamforming system includes an in-ear audio device, such as the wireless earbud described above. The in-ear audio device includes first and second microphones disposed on an external surface of the device (on, i.e., a surface facing away from a body part of a person using and wearing the device); these microphones receive audio including all or substantially all of an available spectrum of human-detectable audio frequencies (e.g., 20 Hz-20 kHz). The present disclosure may refer to these microphones as a "first microphone" and a "second microphone." The in-ear audio device may further include a third microphone disposed on a surface of the device in or near the ear canal of the user; this third microphone, which may be referred to as an "third microphone," may be disposed on an inner-lobe insert of the audio device. The inner-lobe insert (or similar feature of the audio device) may contact the inner surface of the ear canal of the user; this contact, or "seal," may act as a sound barrier and/or sound filter. In various embodiments, the seal filters high frequencies from audio passing from the outside to the ear canal of the user; the seal may pass lower frequencies, such as frequencies between 20 Hz-3 kHz. The third microphone thus receives audio corresponding to these lower frequencies.

FIG. 1 illustrates a system for beamforming including a first device 110a (e.g., a primary earbud) and a second device 110b (e.g., a secondary earbud). The first device 110a and the second device 110b may communicate using a first wireless connection 114a, which may be a Bluetooth, NFMI, or similar connection. In other embodiments, the first device 110a and second device 110b communicate using a wired connection. The first device 110a communicates with a third device 112, such as a smartphone, smart watch, or similar device, using a second connection 114b, which may also be a wireless connection such as a Bluetooth Wi-Fi connection or a wired connection. The present disclosure may refer to particular Bluetooth protocols, such as classic Bluetooth, Bluetooth Low Energy ("BLE" or "LE"), Bluetooth Basic Rate ("BR"), Bluetooth Enhanced Data Rate ("EDR"), synchronous connection-oriented ("SCO"), and/or enhanced SCO ("eSCO"), but the present disclosure is not limited to any particular Bluetooth or other protocol. In some embodiments, however, a first wireless connection 114a between the first device 110a and the second device 110b is a low-power connection such as BLE; the second wireless connection 114b may include a high-bandwidth connection such as EDR in addition to or instead of a BLE connection. The third device 112 may communicate with one or more remote device(s) 120, which may be server devices, via a network 199, which may be the Internet, a wide- or local-area network, or any other network. The first device 110a may output first output audio 15a, and the second device 110b may output second output audio 15b. The first device 110a and second device 110b may capture input audio 11 from a user 5, process the input audio 11, and/or send the input audio 11 and/or processed input audio to the third device 112 and/or remote device(s) 120, as described in greater detail below.

In various embodiments, the first and/or second device 110a/110b receives (130), from a first microphone disposed on the device 110a/110b, first audio data corresponding to a first representation of first audio. The device 110a/110b further receives (132), from a second microphone disposed on the device 110a/110b, second audio data corresponding to a second representation of the first audio and receives (134) from a third microphone disposed on the device 110a/110b, third audio data corresponding to a third representation of the first audio. As explained further below, the first microphone may be a first external microphone and may act as a first primary microphone; the second microphone may be a second external microphone and may act as a secondary microphone; and the third microphone may be an internal microphone and may act as a second primary microphone.

The device 110a/110b generates (136) first output audio data by combining the first audio data with at least a portion of the third audio data. The device 110a/110b generates (138) reference audio data by subtracting at least a portion of the first audio data and at least a portion of the third audio data from the second audio data. The device 110a/110b generates (140) generates second output audio data by subtracting at least a portion of the reference audio data from the first output audio data. The device 110a/110b may send the second output audio data to another device for output and/or for analysis, such as automatic speech recognition.

Figure 2:
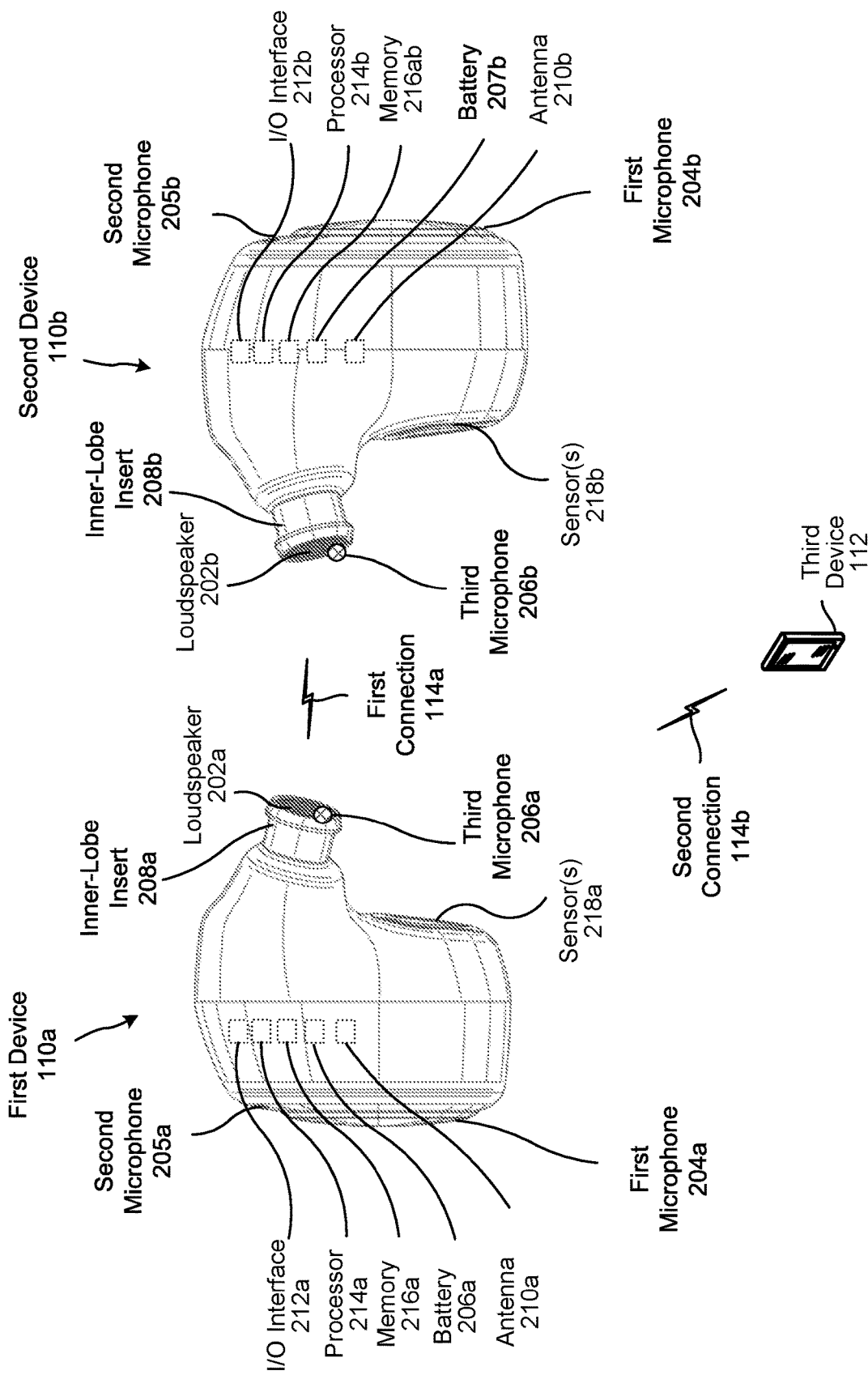
FIGS. 2A and 2B illustrate devices for beamforming an audio signal received from first, second, and third microphones according to embodiments of the present disclosure.

FIGS. 2A and 2B illustrate an embodiment of the first device 110a and second device 110b, respectively. As shown, the first device 110a and second device 110b have similar features; in other embodiments, as noted above, the second device 110b (i.e., the secondary device) may have only a subset of the features of the first device 110a. As illustrated, the first device 110a and second device 110b are depicted as wireless earbuds having an inner-lobe insert; as mentioned above, however, the present disclosure is not limited to only wireless earbuds, and any wearable audio input/output system, such as a headset, over-the-ear headphones, or other such systems, is within the scope of the present disclosure.

The devices 110a/110b may include a loudspeaker 202a/202b, one or more external microphone(s) (such as first microphones 204a/204b and second microphones 205a/205b) and one or more internal microphones (such as third microphones 206a/206b). The loudspeaker 202a/202b may be any type of loudspeaker, such as an electrodynamic speaker, electrostatic speaker, diaphragm speaker, or piezoelectric loudspeaker; the microphones 204a/204b/205a/205b/206a/206b may be any type of microphones, such as piezoelectric or MEMS microphones. Each device 110a/110b may include one or more microphones 204a/204b/205a/205b/206a/206b.

The loudspeaker 202a/202b and microphones 204a/204b/205a/205b/206a/206b may be mounted on, disposed on, or otherwise connected to the device 110a/110b. The devices 110a/110b further include an inner-lobe insert 208a/208b that may bring the loudspeaker 202a/202b and/or third microphone(s) 206a/206b closer to the eardrum of the user and/or block some ambient noise.

Figure 3:
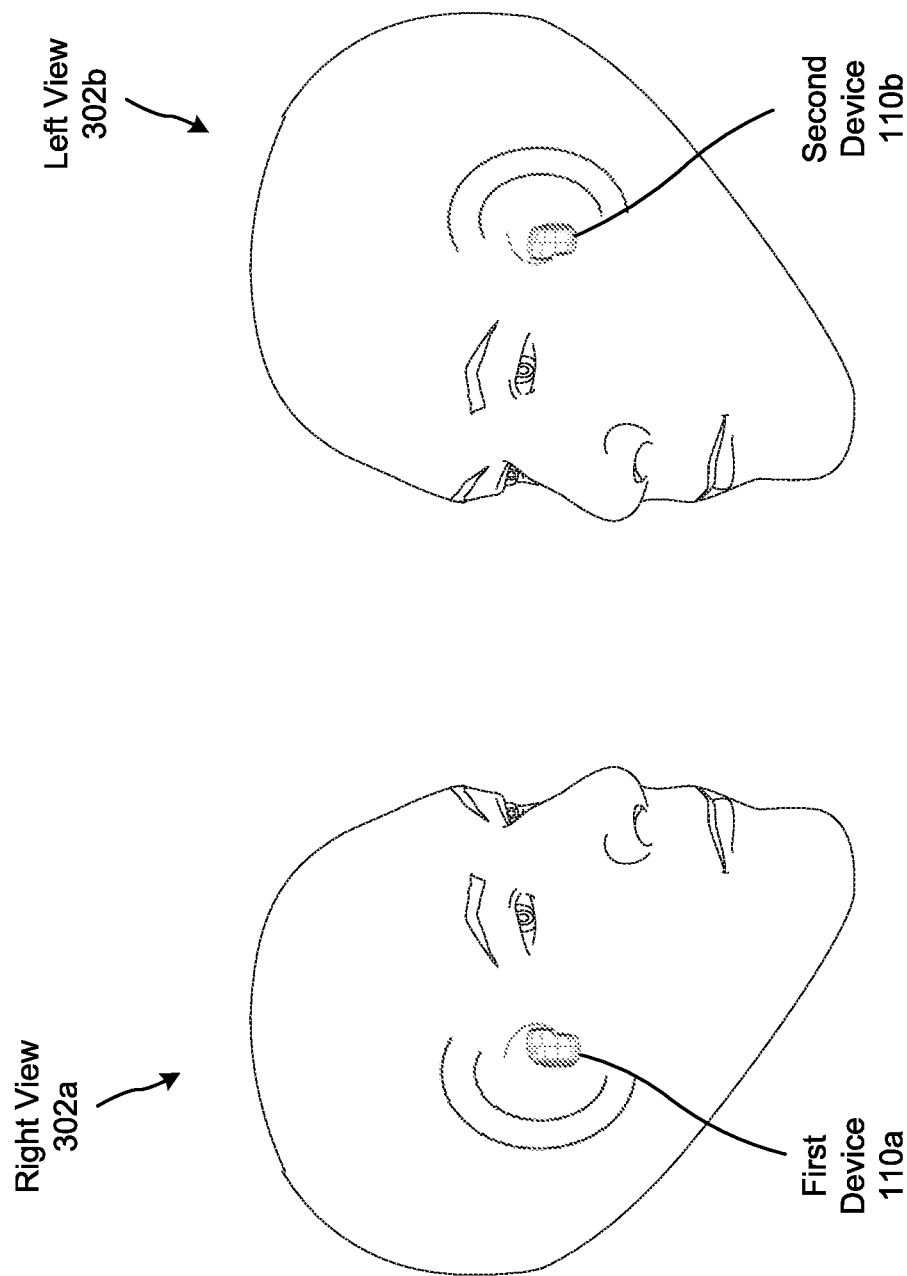
FIG. 3 illustrates various views of use of devices for beamforming an audio signal received from first, second, and third microphones according to embodiments of the present disclosure.

One or more batteries 207a/207b may be used to supply power to the devices 110a/110b. One or more antennas 210a/210b may be used to transmit and/or receive wireless signals over the first connection 114a and/or second connection 114b; an I/O interface 212a/212b contains software and hardware to control the antennas 210a/210b and transmit signals to and from other components. A processor 214a/214b may be used to execute instructions in a memory 216a/216b; the memory 216a/216b may include volatile memory (e.g., random-access memory) and/or non-volatile memory or storage (e.g., flash memory). One or more sensors 218a/218b, such as accelerometers, gyroscopes, or any other such sensor may be used to sense physical properties related to the devices 110a/110b, such as orientation; this orientation may be used to determine whether either or both of the devices 110a/110b are currently disposed in an ear of the user (i.e., the "in-ear" status of each device). The instructions may correspond to the audio-processing component 226, voice-activity detection component 228, wakeword detection component 229, and/or other components discussed above. FIG. 3 illustrates a right view 302a and a left view 302b of a user of the first device 110a and the second device 110b.

Figure 4B:
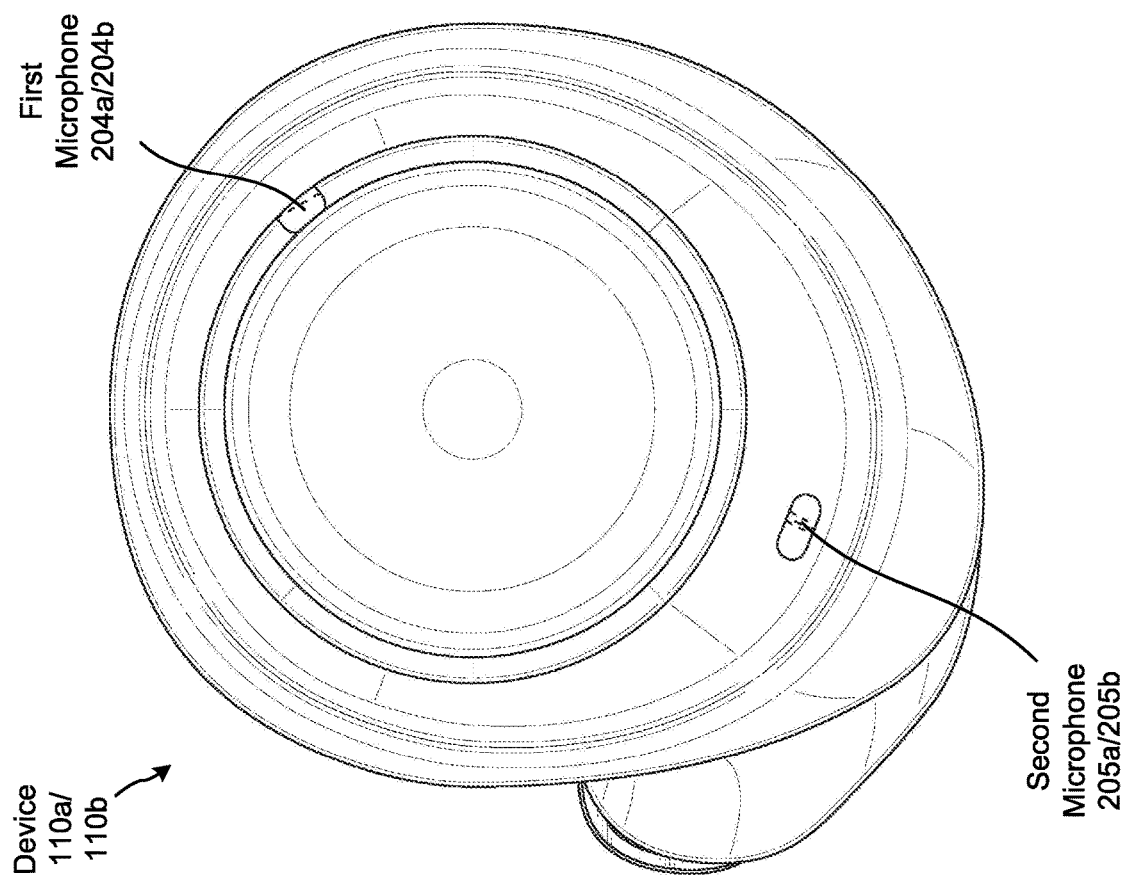
Figure 4C:
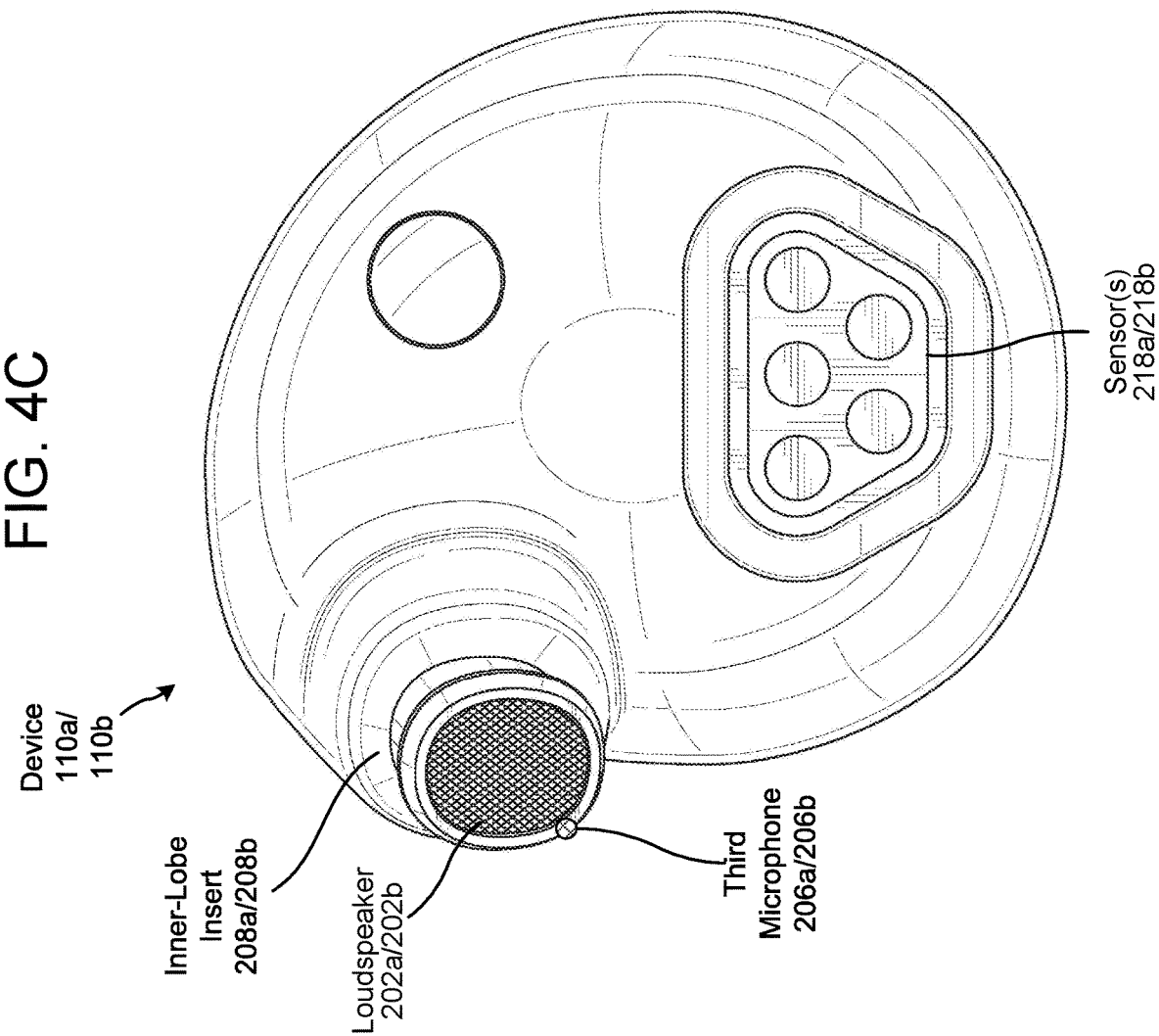

FIGS. 4A, 4B, and 4C illustrate various views of devices for beamforming an audio signal received from first, second, and third microphones according to embodiments of the present disclosure. FIG. 4A illustrates one embodiment of placement of the first microphone 204a/204b and of the second microphone 205a/205b. The first microphone 204a/204b is disposed farther from the inner-lobe insert 208a/208b than is the second microphone 205a/205b; the first microphone 204a/204b may thus be disposed closer to the mouth of the user and may therefore receive audio having a higher signal-to-noise ratio than does the second microphone 205a/205b. FIG. 4B illustrates another one embodiment of the placement of the first microphone 204a/204b and the second microphone 205a/205b. FIG. 4C illustrates one embodiment of the placement of the loudspeaker 202a/202b, third microphone 206a/206b, inner-lobe insert 208a/208b, and sensor(s) 218a/218b. The present disclosure is not limited, however, to only these placements, and other placements of the microphones are within its scope.

Figure 5:
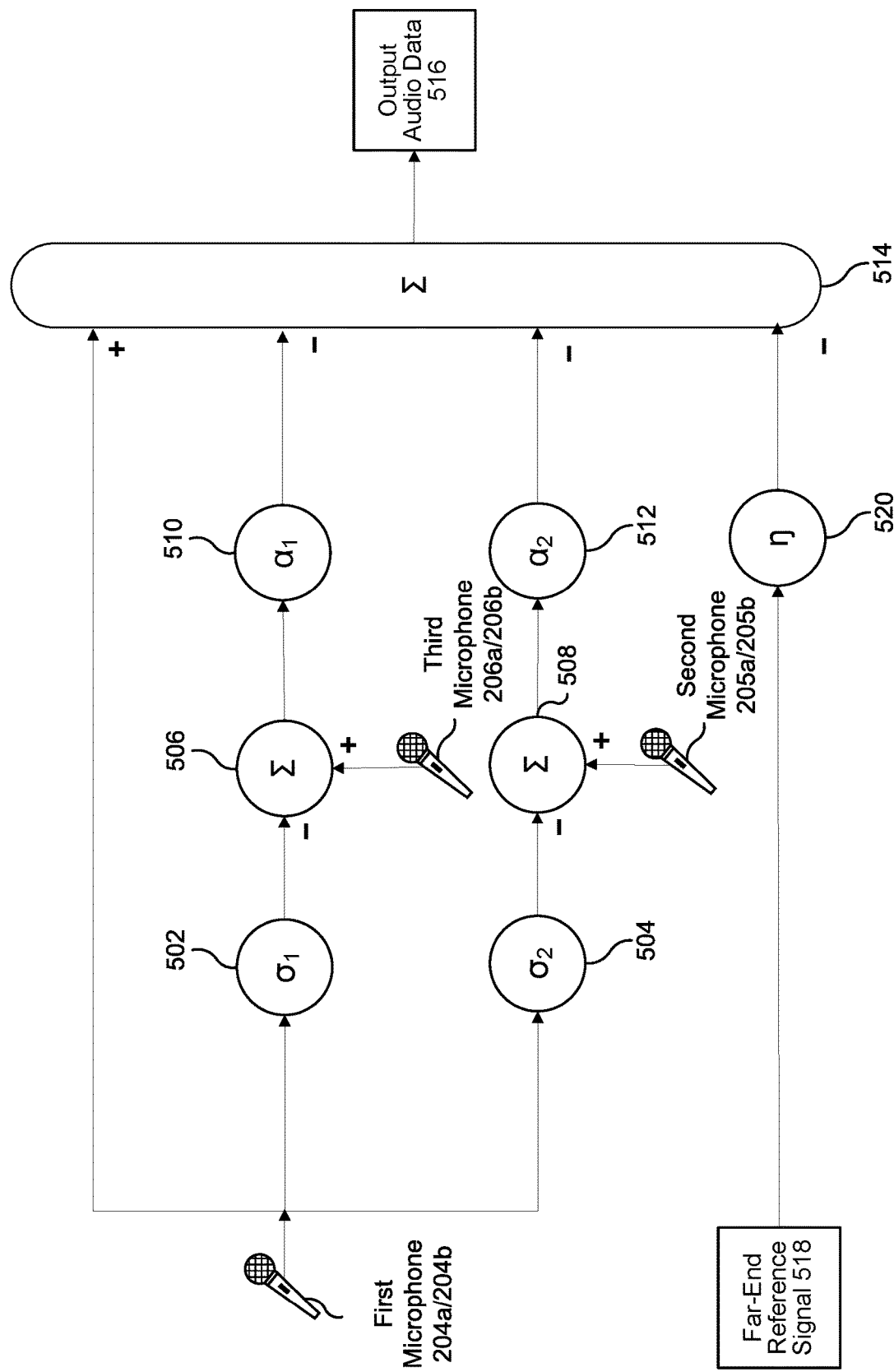
FIG. 5 illustrates a system for beamforming an audio signal received from first, second, and third microphones according to embodiments of the present disclosure.

FIG. 5 illustrates a system for beamforming an audio signal received from first, second, and third microphones according to embodiments of the present disclosure. In these embodiments, the first microphone 204a/204b is used as the sole primary microphone, and the second microphone 205a/205b and the third microphone 206a/206b are used as secondary microphones. A first filter 502, which may be a finite-impulse-response (FIR) filter, infinite-impulse-response (IIR) filter, other filter, or other signal-processing element, receives audio data from the first microphone 204a/204b and modifies it in accordance with a first steering coefficient $\sigma_1$. The first steering coefficient $\sigma_1$ may be one or more complex numbers that modify a phase and/or amplitude of the audio data; the first filter 502 may include a set of filter coefficients that cause the filter 502 to modify the audio data in accordance with the first steering coefficient $\sigma_1$. The first steering coefficient $\sigma_1$ may correspond to the relative placement, properties, and orientation of the microphones 204/205/206 and may vary in accordance with a desired steering angle (e.g., the first steering coefficient $\sigma_1$ may have different values for 0°, 45°, and 90° steering angles). The first steering coefficient $\sigma_1$ may be determined by simulation and/or experimentation. A second filter 504 may similarly receive audio data from the first microphone 204a/204b and modify it in accordance with a second steering coefficient $\sigma_2$ using a second set of corresponding filter coefficients.

A first summing component 506 subtracts the output of the first filter 502 from audio data received from the third microphone 206a/206b, and a second summing component 508 subtracts the output of the second filter 504 from audio data received from the second microphone 205a/205b. The summing components 506, 508 may be hardware or software adder components; in some embodiments, the summing components 506, 508 are part of the filters 502/504.

A third filter 510 and a fourth filter 512 may then use the outputs of the summing components 506 and 508 to cancel and/or suppress residual echoes. A third coefficient $\alpha_1$ may be associated with the third filter 510 and a fourth coefficient $\alpha_1$ may be associated with the fourth filter 512, which may implement the coefficients using a corresponding set of filter coefficients. The third coefficient $\alpha_1$ and the fourth coefficient $\alpha_2$ may be selected to maximize a signal-to-noise ratio of output audio data 516. The device 110a/110b may determine the third coefficient $\alpha_1$ and the fourth coefficient $\alpha_2$ using any technique known in the art, such as gradient descent or least-mean-squares. A fifth summing component 514 may then subtract the output of the third filter 510 and the fourth filter 512 from the audio data from the first microphone 204a/204b to create the output audio data 516.

In some embodiments, the device 110a/110b also receives a far-end reference signal 518. This far-end reference signal 518 may correspond to audio data received by the device 110a/110b for playback thereon, such as voice data representing speech during (e.g.) a phone call, music data corresponding to music, or other data. A fifth filter 520 may modify the far-end reference signal 518 by, for example, changing its phase and/or magnitude, and the fifth summing element 514 may subtract the result from the output audio data 516.

Figure 6:
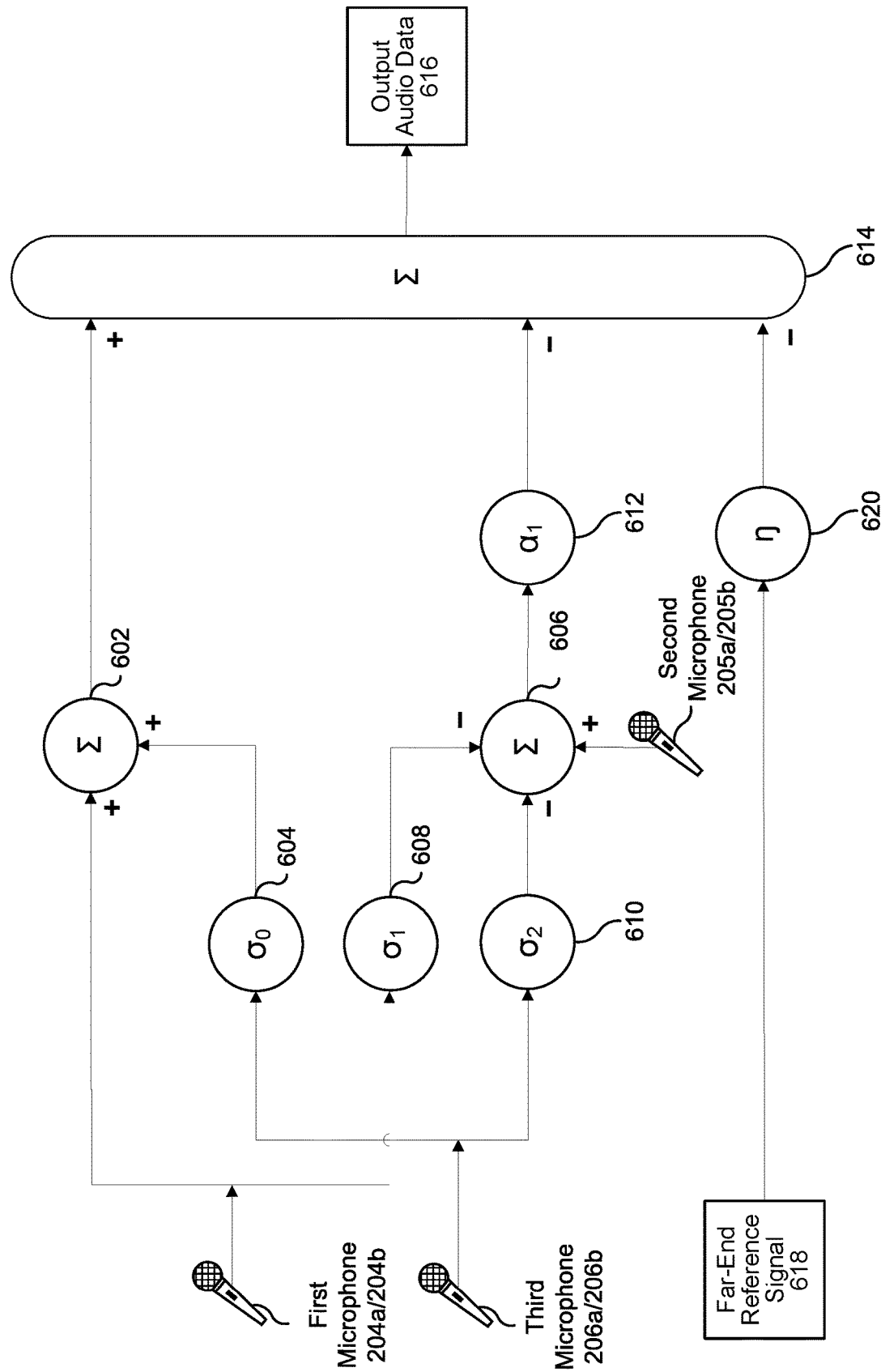
FIG. 6 illustrates another system for beamforming an audio signal received from first, second, and third microphones according to embodiments of the present disclosure.

FIG. 6 illustrates another system for beamforming an audio signal received from first, second, and third microphones according to embodiments of the present disclosure. In these embodiments, the first microphone 204a/204b is used as the first primary microphone, the third microphone 206a/206b is used as the second primary microphone, and the second microphone 205a/205b is used as a secondary microphone. The primary microphones may be used to generate target audio (i.e., desired audio from a selected direction) and the secondary microphone may be used to generate reference or noise audio, which may be removed from the target audio as described below.

In these embodiments, a first summing component 602 adds the output of the first microphone 204a/204b with the output of the third microphone 206a/206b, as modified by a first filter 604 having a first steering coefficient $\sigma_0$. As described with reference to FIG. 5, the summing component 602 may be a hardware or software adder component; in some embodiments, the summing component 602 is part of the first filter 604. The first filter 604 may be an FIR or other filter and may include a set of filter coefficients that correspond to the first steering coefficient $\sigma_1$, and the first filter 604 may modify the phase and/or magnitude of the audio data. The first steering coefficient $\sigma_1$ may correspond to the relative placement, properties, and orientation of the microphones 204/205/206 and may vary in accordance with a desired steering angle (e.g., the first steering coefficient $\sigma_1$ may have different values for 0°, 45°, and 90° steering angles). The first steering coefficient $\sigma_1$ may be determined by simulation and/or experimentation.

A second summing element 606 removes audio data received by the first microphone 204a/204b—as modified by a second filter 608 having a second steering coefficient $\sigma_1$—and audio data received by the third microphone 206a/206b—as modified by a third filter 610 having a third steering coefficient $\sigma_2$—from audio data from the second microphone 205a/205b. The output of the second summing element 606 may be referred to as a reference signal or as a noise signal.

A fourth filter 612 applies a fourth coefficient $\alpha_1$ to cancel and/or suppress residual echoes. As described above, the fourth coefficient $\alpha_1$ may be selected to maximize a signal-to-noise ratio of output audio data 616. The device 110a/110b may determine the third coefficient cu using any technique known in the art, such as gradient descent or least-mean-squares. A fifth summing component 514 may then subtract the output of the third filter 510 from the audio data from the first summing component 602 to create the output audio data 516.

In some embodiments, the device 110a/110b also receives a far-end reference signal 618. This far-end reference signal 618 may correspond to audio data received by the device 110a/110b for playback thereon, such as voice data representing speech during (e.g.) a phone call, music data corresponding to music, or other data. A fifth filter 620 may modify the far-end reference signal 618 by, for example, changing its phase and/or magnitude, and the fifth summing element 614 may subtract the result from the output audio data 616.

Figure 7:
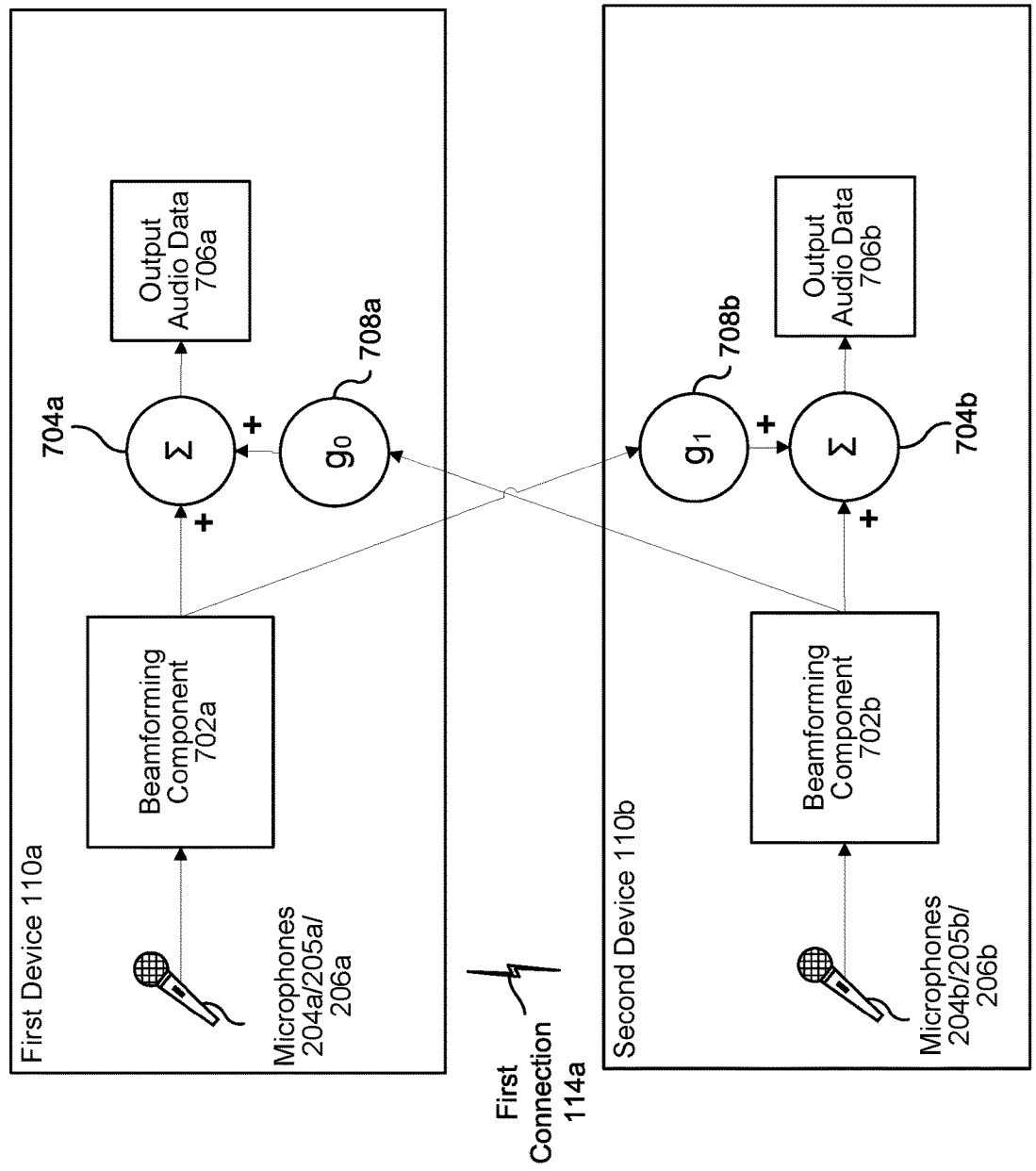
FIG. 7 illustrates a system for beamforming an audio signal received from first, second, and third microphones from each of two devices according to embodiments of the present disclosure.

FIG. 7 illustrates a system for beamforming an audio signal received from first, second, and third microphones from each of two devices according to embodiments of the present disclosure. The first device 110a includes a first beamforming component 802a, which may include the system of FIG. 6 as explained in greater detail below. The second device 110b includes a second beamforming component 802b. In various embodiments, the first beamforming component 802a sends, via the first connection 114a, output audio data to the second device 110b; the second beamforming component 802b sends, via the first connection 114a, output audio data to the first device 110a. The first device 110a receives the output audio data from the second device 110b, and a first summing component 704a combines the output of the beamforming component 802a with the audio data received from the second device 110b to create output audio data 706a. Similarly, the second device 110a receives the output audio data from the first device 110a, and a second summing component 704b combines the output of the beamforming component 802b with the audio data received from the first device 110a to create output audio data 706b. The output of each beamforming component 702a, 702b may be filtered to change its phase, amplitude, or other property prior to being added with the other output of the other beamforming component 702a, 702b using filters 708a, 708b.

The first device 110a and second device 110b may similarly share one or more filter coefficients using the first connection 114a. In various embodiments, the second device 110b sends one or more filter coefficients, such as the filter coefficients corresponding to the $\sigma_1$ or $\alpha_1$ coefficients described above, to the first device 110a. The first device 110a may then aggregate corresponding coefficients by, for example, finding an average value between corresponding coefficients. The first device 110a may thereafter update its filters with the aggregated coefficients and/or send the aggregated coefficients to the second device 110b, which may similarly update its filters.

In some embodiments, the first device 110a sends data received by one or more microphones 204a, 205a, 206a to the second device 110b; the second device 110b may similarly send data received by one or more microphones 204b, 205b, 206b to the first device 110a. The first device 110a may thus, for example, use four microphones as primary microphones: the first microphone 204a and third microphone 205a of the first device 110a and the first microphone 204b and third microphone 205b of the second device 110b. In these embodiments, the first device 110a may use the second microphone 205a and the second microphone 205b as secondary microphones. In other embodiments, either the second microphone 206a or the first microphone 205b is designated as a secondary microphone.

Figure 8:
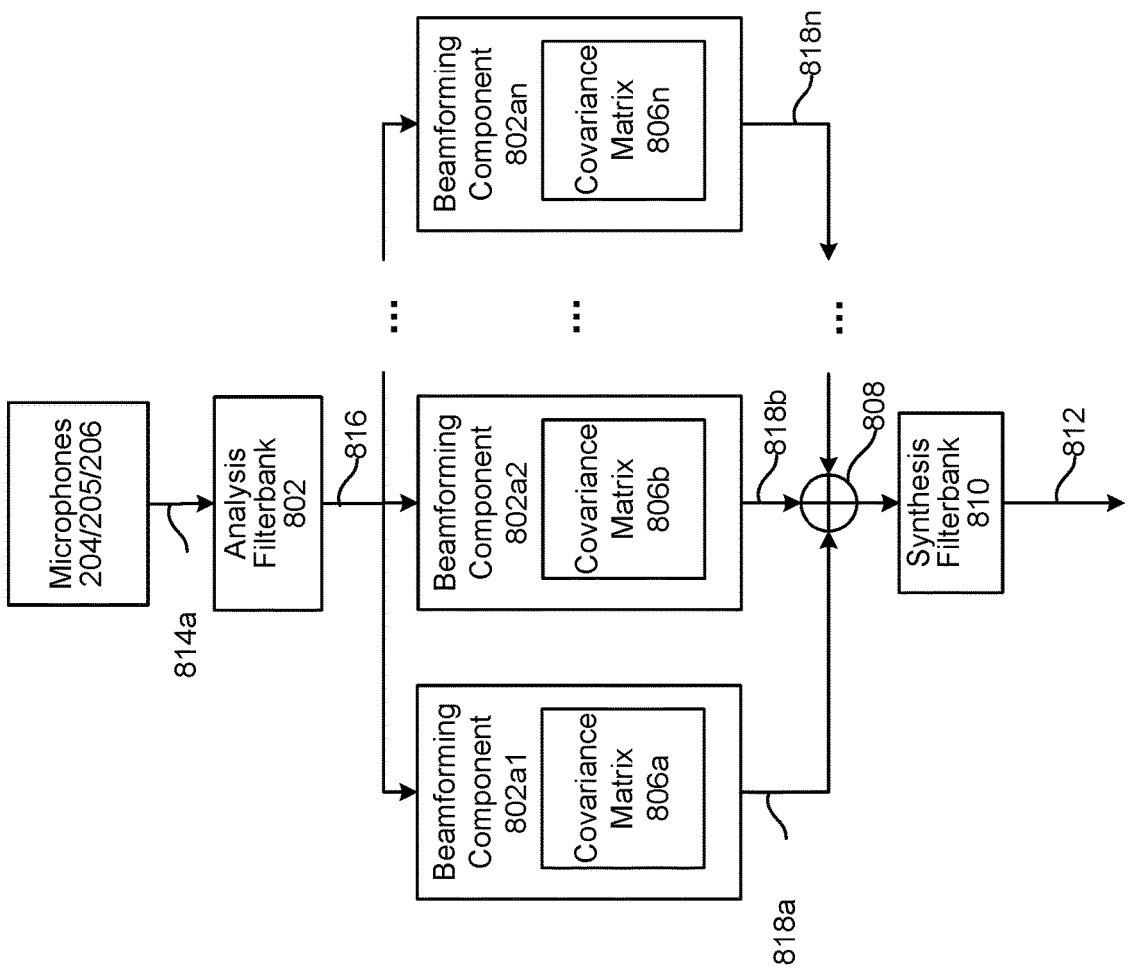
FIG. 8 illustrates a beamforming system according to embodiments of the present disclosure.

FIG. 8 illustrates components of the system in greater detail. An analysis filterbank 802 receives the first audio signal 814a from the first microphone array 102a and the second audio signal 814b from the second microphone array 102b. Each audio signal 814a/814b may correspond to one or more microphones. The analysis filterbank 802 may include hardware, software, and/or firmware for processing audio signals and may convert the first and/or second audio data 814a/814b from the time domain into the frequency/sub-band domain. The analysis filterbank 802 may thus create one or more frequency-domain signals 816; the frequency-domain signals 816 may correspond to multiple adjacent frequency bands. The analysis filterbank 110 may include, for example, a uniform discrete Fourier transform (DFT) filterbank that converts the time-domain input audio data 102a/102b into one or more frequency-domain signals 816. The frequency-domain signal 816 may incorporate audio signals corresponding to multiple different microphones as well as different sub-bands (i.e., frequency ranges) as well as different frame indices (i.e., time ranges).

The frequency-domain signal(s) 816 created by the analysis filterbank 802 is/are received by one or more beamforming components 804a, 804b, . . . 804n, collectively referred to herein as beamforming components 804. In various embodiments, the number of beamforming components 804 corresponds to the number of frequency sub-bands of the frequency-domain signal 816; if, for example, the analysis filterbank 802 breaks the audio signals 102a/102b into ten different frequency sub-bands, the system includes ten beamforming components 804 to process each of the ten different frequency sub-bands. Each beamforming component 804 may include the filters and summing components described above with reference to FIGS. 6 and 7.

In various embodiments, a sound (such as an utterance) may be received by more than one microphone, such as by the first microphone 204a/204b, the second microphone 205a/205b, and the third microphone 206a/206b. Because the microphones are disposed at different locations, each microphone may capture a different version of the sound; each version may differ in one or more properties or attributes, such as volume, time delay, frequency spectrum, power level, amount and type of background noise, or any other similar factor. Each beamforming component 804 may utilize these differences to isolate and boost sound from a particular azimuth direction and/or elevation while suppressing sounds from other azimuth directions and/or elevation. Any particular system and method for beamforming is within the scope of the present invention.

In various embodiments, the beamforming component is a minimum-variance distortionless-response (MVDR) beamformer. A MVDR beamformer may apply filter coefficients, or "weights" w to the frequency-domain signal 816 in accordance with the following equation:

$$w = \frac{Q^{-1}d}{d^H Q^{-1} d} \qquad (1)$$

In Equation (1), Q is the covariance matrix and may correspond to the cross-power spectral density (CPSD) of a noise field surrounding the system 100, and d is a steering vector that corresponds to a transfer function between the system 100 and a target source of sound located at a distance (e.g., two meters) from the system 100. The covariance matrix may define the spatial relationships between the microphones; this covariance matrix may include a number of covariance values corresponding to each pair of microphones. The covariance matrix is a matrix whose covariance value in the i, j position represents the covariance between the $i^{th}$ and $j^{th}$ elements of the microphone arrays. If the greater values of one variable mainly correspond with the greater values of the other variable, and the same holds for the lesser values, (i.e., the variables tend to show similar behavior), the covariance is positive. In the opposite case, when the greater values of one variable mainly correspond to the lesser values of the other, (i.e., the variables tend to show opposite behavior), the covariance is negative. In some embodiments, the covariance matrix is a spatial covariance matrix (SCM).

For example, a covariance value corresponding to the second row and third column of the matrix corresponds to the relationship between second and third microphones. In various embodiments, the values of the diagonal of the covariance matrix differ for the first and second microphone arrays; the covariance values of the diagonal corresponding to the first microphone may, for example, be greater than the covariance values of the diagonal corresponding to the second microphone. When input audio is processed with the covariance matrix, an utterance from an azimuth direction and/or elevation is more clearly distinguished and better able to be processed with, for example, ASR or speech-to-text processing.

In various embodiments, a different covariance matrix is determined for each of multiple frequency sub-bands. For example, a first covariance matrix is determined for frequencies between 20 Hz and 5 kHz; a second covariance matrix is determined for frequencies between 5 kHz and 10 kHz; a third covariance matrix is determined for frequencies between 10 kHz and 15 kHz; and a fourth covariance matrix is determined for frequencies between 15 kHz and 20 kHz. Any number of covariance matrices for any number or breakdown of frequency sub-bands is, however, within the scope of the present disclosure.

Each beamforming component 804 may create a beamformed frequency-domain signal 818 that, as described above, emphasizes or boosts audio from a particular azimuth direction and/or elevation for, in some embodiments, the frequency sub-band associated with each beamforming component 804. The beamformed frequency-domain signal(s) 818 may be combined, if necessary, using a summation component 808. Once the combined signal is determined, it is sent to synthesis filterbank 810 which converts the combined signal into time-domain audio output data 812 which may be sent to a downstream component (such as a speech processing system) for further operations (such as determining speech processing results using the audio output data). The synthesis filterbank 810 may include an inverse FFT function for synthesizing the time-domain audio output data; any system or method for creating time-domain signals from frequency-domain signals is, however, within the scope of the present disclosure.

Various machine learning techniques may be used to create the weight values of the covariance matrix. For example, a model may be trained to determine the weight values. Models may be trained and operated according to various machine learning techniques. Such techniques may include, for example, inference engines, trained classifiers, etc. Examples of trained classifiers include conditional random fields (CRF) classifiers, Support Vector Machines (SVMs), neural networks (such as deep neural networks and/or recurrent neural networks), decision trees, AdaBoost (short for "Adaptive Boosting") combined with decision trees, and random forests. In particular, CRFs are a type of discriminative undirected probabilistic graphical models and may predict a class label for a sample while taking into account contextual information for the sample. CRFs may be used to encode known relationships between observations and construct consistent interpretations. A CRF model may thus be used to label or parse certain sequential data, like query text as described above. Classifiers may issue a "score" indicating which category the data most closely matches. The score may provide an indication of how closely the data matches the category.

In order to apply the machine learning techniques, the machine learning processes themselves need to be trained. Training a machine learning component such as, in this case, one of the first or second models, requires establishing a "ground truth" for the training examples. In machine learning, the term "ground truth" refers to the accuracy of a training set's classification for supervised learning techniques. For example, known types for previous queries may be used as ground truth data for the training set used to train the various components/models. Various techniques may be used to train the models including backpropagation, statistical learning, supervised learning, semi-supervised learning, stochastic learning, stochastic gradient descent, or other known techniques. Thus, many different training examples may be used to train the classifier(s)/model(s) discussed herein. Further, as training data is added to, or otherwise changed, new classifiers/models may be trained to update the classifiers/models as desired.

Figure 9:
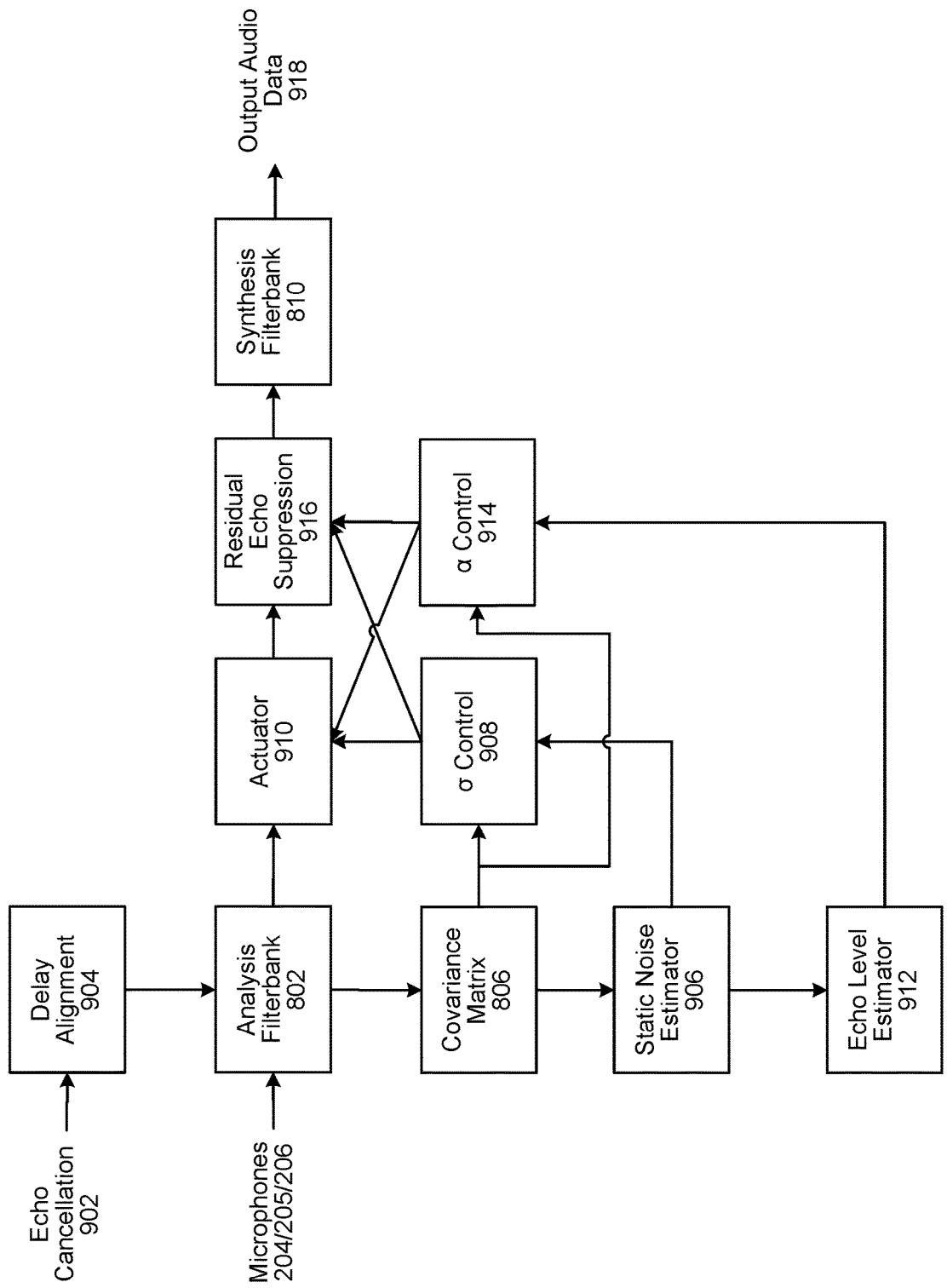
FIG. 9 illustrates another beamforming system according to embodiments of the present disclosure.

FIG. 9 is another diagram of a beamforming system in accordance with embodiments of the present disclosure. The analysis filterbank 802 receives audio data from the microphones 204/205/205 and, as described above, creates one or more frequency bins corresponding to different frequencies of the audio data. Echo-cancellation data 902 may be received from for example, the far-end reference signal 618, and the delay of the echo-cancellation data 902 may be changed with a delay-alignment unit 904; this delay-adjusted echo-cancellation data may be used by the analysis filterbank 802 to create the frequency data. The beamforming component may include the covariance matrix described above. The beamforming unit may further include a static noise estimator 906 for estimating static noise in the audio data, such as constant noise. The beamforming unit 802 may further include a σ control unit 908 for determining the σ coefficients described above; each σ control unit 908 may determine different σ coefficients for each frequency bin, and the σ coefficients may vary based on the look angle or steering angle. The beamforming unit 802 may further include an actuator 910 that includes the filters and summing components described above with reference to FIGS. 6 and 7.

A residual echo level may be estimated by an echo level estimator 912; the residual echo level may be used by an α control unit 914 to determine the α coefficients, as described above. A residual echo suppression unit 916 may use the α coefficients to suppress a residual echo, as described above. A synthesis filterbank 810 may combine the frequency-domain outputs corresponding to the one or more frequency bins and create time-domain audio output data 918.

Figure 10:
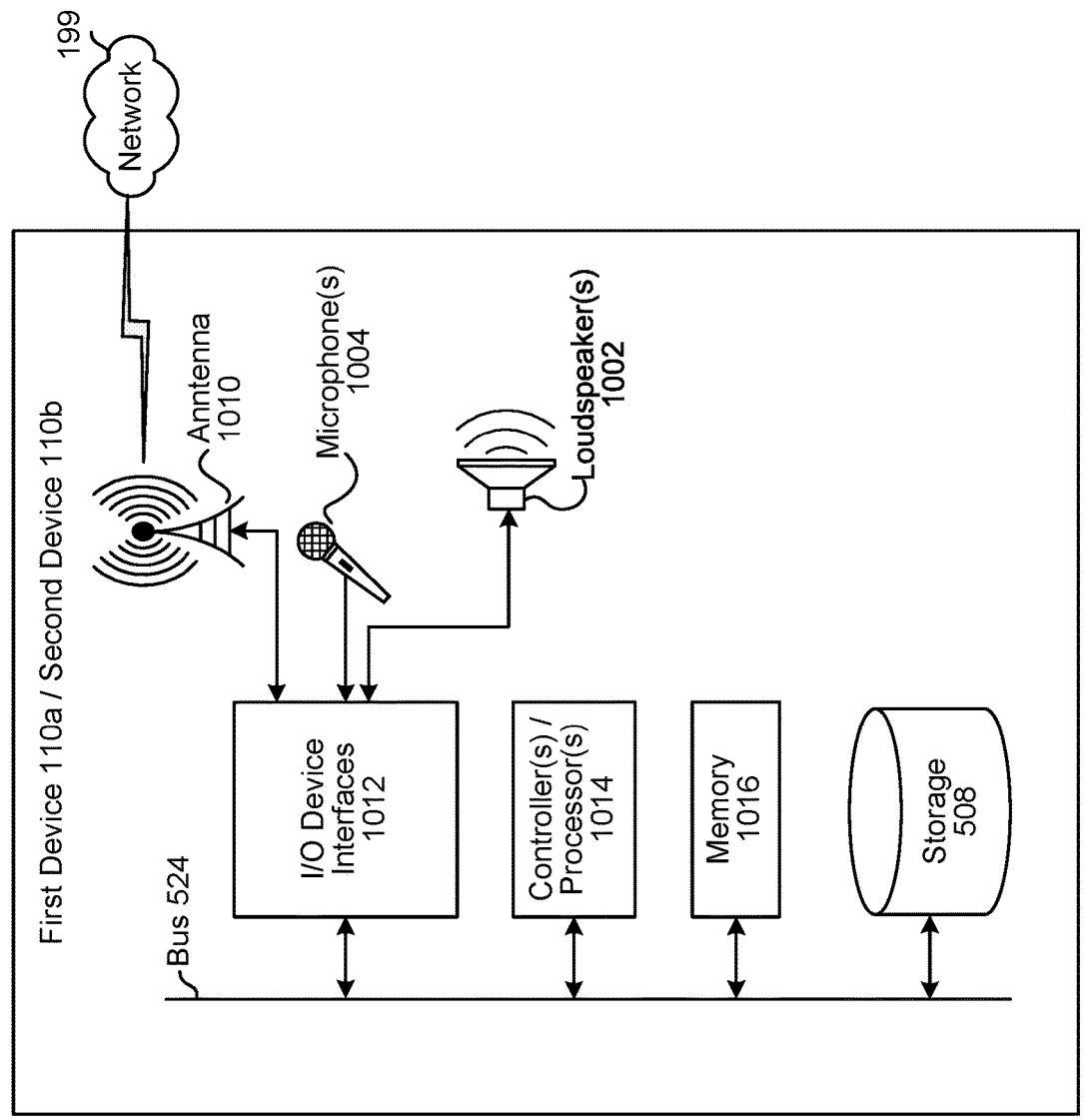
FIG. 10 is a block diagram conceptually illustrating example components of a system for beamforming according to embodiments of the present disclosure.

FIG. 10 is a block diagram conceptually illustrating example components of the system 100. In operation, the system 100 may include computer-readable and computer-executable instructions that reside on the system, as will be discussed further below. The system 100 may include one or more audio capture device(s), such as a first microphone array 102a and a second microphone array 102b, each of which may include a plurality of microphones. The audio capture device(s) may be integrated into a single device or may be separate. The system 100 may also include an audio output device for producing sound, such as speaker(s) 1010. The audio output device may be integrated into a single device or may be separate. The system 100 may include an address/data bus 1012 for conveying data among components of the system 100. Each component within the system may also be directly connected to other components in addition to (or instead of) being connected to other components across the bus 1012.

The system 100 may include one or more controllers/processors 1004 that may each include a central processing unit (CPU) for processing data and computer-readable instructions, and a memory 1006 for storing data and instructions. The memory 1006 may include volatile random access memory (RAM), non-volatile read only memory (ROM), non-volatile magnetoresistive (MRAM) and/or other types of memory. The system 100 may also include a data storage component 1008, for storing data and controller/processor-executable instructions (e.g., instructions to perform operations discussed herein). The data storage component 1008 may include one or more non-volatile storage types such as magnetic storage, optical storage, solid-state storage, etc. The system 100 may also be connected to removable or external non-volatile memory and/or storage (such as a removable memory card, memory key drive, networked storage, etc.) through the input/output device interfaces 1002.

Computer instructions for operating the system 100 and its various components may be executed by the controller(s)/processor(s) 1004, using the memory 1006 as temporary "working" storage at runtime. The computer instructions may be stored in a non-transitory manner in non-volatile memory 1006, storage 1008, and/or an external device. Alternatively, some or all of the executable instructions may be embedded in hardware or firmware in addition to or instead of software.

The system may include input/output device interfaces 1002. A variety of components may be connected through the input/output device interfaces 1002, such as the speaker(s) 1010, the microphone arrays 102a/102b, and a media source such as a digital media player (not illustrated). The input/output interfaces 1002 may include A/D converters (not shown) and/or D/A converters (not shown).

The system may include one or more beamforming components 802—which may each include one or more covariance matrix(es) 806—analysis filterbank 802, synthesis filterbank 810, and/or other components for performing the processes discussed above.

The input/output device interfaces 1002 may also include an interface for an external peripheral device connection such as universal serial bus (USB), FireWire, Thunderbolt or other connection protocol. The input/output device interfaces 1002 may also include a connection to one or more networks 1099 via an Ethernet port, a wireless local area network (WLAN) (such as WiFi) radio, Bluetooth, and/or wireless network radio, such as a radio capable of communication with a wireless communication network such as a Long Term Evolution (LTE) network, WiMAX network, 3G network, etc. Through the network 1099, the system 100 may be distributed across a networked environment.

Figure 11:
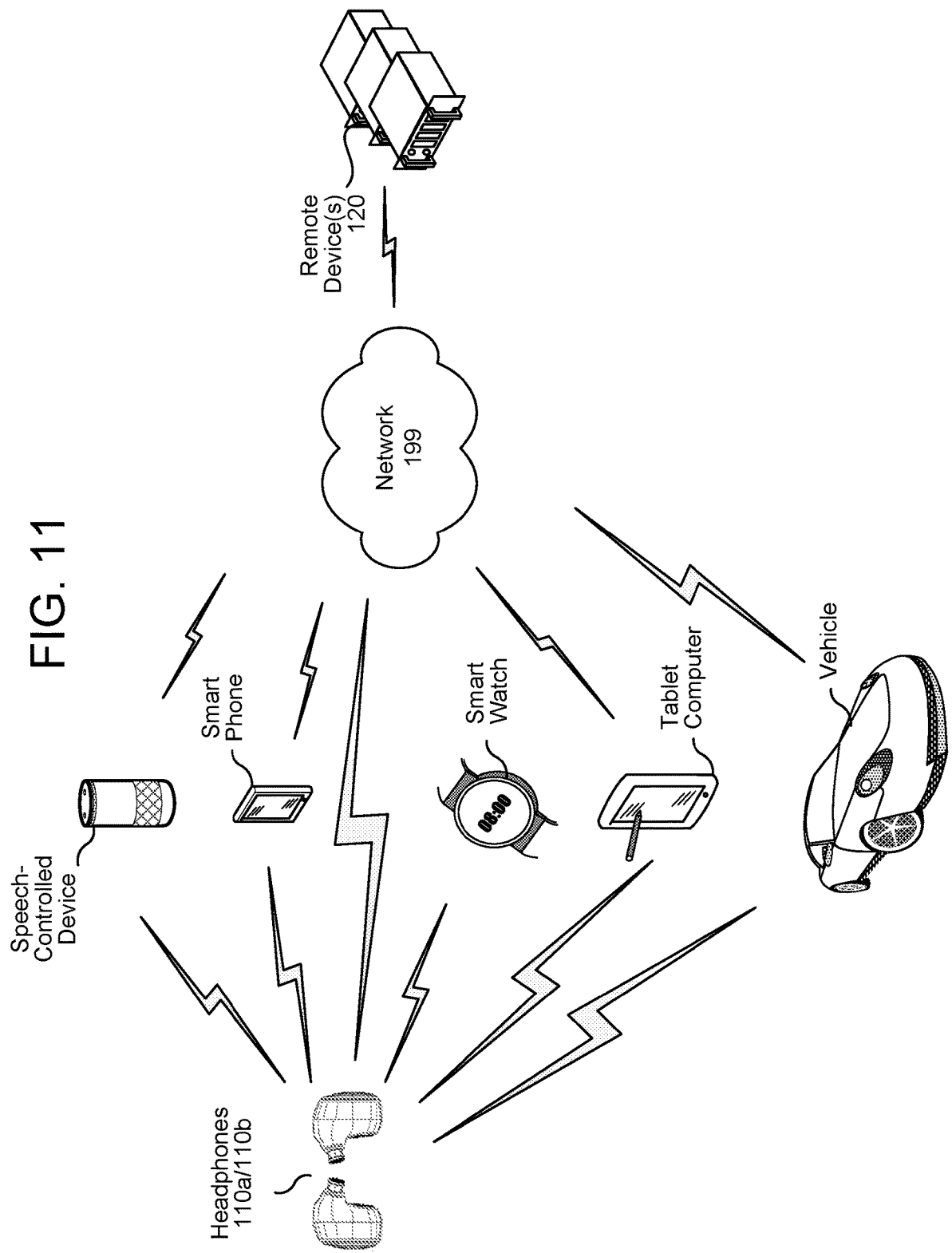
FIG. 11 is a diagram conceptually illustrating example communication between components of a system for beamforming according to embodiments of the present disclosure.

As illustrated in FIG. 11, multiple devices may contain components of the system 100 and the devices may be connected over a network 199. The network 199 may include one or more local-area or private networks and/or a wide-area network, such as the internet. Local devices may be connected to the network 199 through either wired or wireless connections. For example, a speech-controlled device, a tablet computer, a smart phone, a smart watch, and/or a vehicle may be connected to the network 199. One or more remote device(s) 120 may be connected to the network 199 and may communicate with the other devices therethrough. The devices 110a/110b may similarly be connected to the remote device(s) 120 either directly or via a network connection to one or more of the local devices. The devices 110a/110b may capture audio using one or more microphones or other such audio-capture devices; the headphones 110a/110b may perform audio processing, voice-activity detection, and/or wakeword detection, and the remove device(s) 120 may perform automatic speech recognition, natural-language processing, or other functions.

Multiple devices may be employed in a single system 100. In such a multi-device system, each of the devices may include different components for performing different aspects of the processes discussed above. The multiple devices may include overlapping components. The components listed in any of the figures herein are exemplary, and may be included a stand-alone device or may be included, in whole or in part, as a component of a larger device or system. For example, certain components, such as the beamforming components 802, may be arranged as illustrated or may be arranged in a different manner, or removed entirely and/or joined with other non-illustrated components.

The concepts disclosed herein may be applied within a number of different devices and computer systems, including, for example, general-purpose computing systems, multimedia set-top boxes, televisions, stereos, radios, server-client computing systems, telephone computing systems, laptop computers, cellular phones, personal digital assistants (PDAs), tablet computers, wearable computing devices (watches, glasses, etc.), other mobile devices, etc.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of digital signal processing and echo cancellation should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk and/or other media. In addition, components of system may be implemented in firmware and/or hardware, such as an acoustic front end (AFE), which comprises, among other things, analog and/or digital filters (e.g., filters configured as firmware to a digital signal processor (DSP)). Some or all of the beamforming component 802 may, for example, be implemented by a digital signal processor (DSP).

Conditional language used herein, such as, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method comprising:
   receiving, from a first microphone disposed on at least one in-ear audio device, first audio data corresponding to a first representation of first audio;
   receiving, from a second microphone disposed on an inner-lobe insert of the at least one in-ear audio device, second audio data corresponding to a second representation of the first audio;
   generating reference audio data using at least a portion of the first audio data and at least a portion of the second audio data;
   generating first output audio data by combining the first audio data with at least a portion of the second audio data; and
   generating second output audio data by subtracting at least a portion of the reference audio data from the first output audio data.

2. The computer-implemented method of claim 1, further comprising:
   receiving, from a user device, second reference audio data corresponding to reference audio; and
   generating, using a set of filter coefficients, modified reference audio data by changing a phase of the reference audio data,
   wherein the reference audio data is the modified reference audio data.

3. The computer-implemented method of claim 1, wherein generating the reference audio data comprises subtracting at least a portion of the first audio data from the second audio data.

4. The computer-implemented method of claim 1, further comprising:
   receiving, from a third microphone disposed on the at least one in-ear audio device, third audio data corresponding to a third representation of the first audio,
   wherein generating the reference audio data further uses the third audio data.

5. The computer-implemented method of claim 4, wherein generating the reference audio data comprises subtracting at least a portion of the first audio data and at least a portion of the third audio data from the second audio data.

6. The computer-implemented method of claim 4, further comprising:
   generating, using a set of filter coefficients, modified third audio data by changing a phase of the third audio data; and
   generating output audio data by adding the first audio data and the modified third audio data.

7. The computer-implemented method of claim 6, further comprising:
   receiving, from a second in-ear audio device, third output audio data;
   generating, using a set of filter coefficients, modified third output audio data by changing a phase of the third output audio data; and
   generating fourth output audio data by adding the output audio data and the modified third output audio data.

8. The computer-implemented method of claim 4, further comprising:
   generating modified first audio data by changing a phase of the first audio data in accordance with a first transfer function defining a relationship between the first microphone and the third microphone; and
   generating modified third audio data by changing a phase of the third audio data in accordance with a second transfer function defining a relationship between the second microphone and the second microphone,
   wherein generating the reference audio data further comprises subtracting the modified first audio data and the modified third audio data from the second audio data.

9. The computer-implemented method of claim 1, further comprising:
receiving third output audio data from a second in-ear audio device; and
generating fourth output audio data by combining at least a portion of the second output audio data and at least a portion of the third output audio data.

10. The computer-implemented method of claim 1, further comprising:
receiving, from a third microphone disposed on a second in-ear audio device, third audio data corresponding to a third representation of the first audio;
receiving, from a fourth microphone disposed on an inner-lobe insert of the second in-ear audio device, fourth audio data corresponding to a fourth representation of the first audio;
generating second reference audio data using at least a portion of the third audio data and at least a portion of the fourth audio data;
generating third output audio data by combining the third audio data with at least a portion of the fourth audio data; and
generating fourth output audio data by subtracting at least a portion of the second reference audio data from the third output audio data.

11. The computer-implemented method of claim 10, further comprising:
receiving the second output audio data from the at least one in-ear audio device; and
generating fifth output audio data by combining at least a portion of the second output audio data and at least a portion of the fourth output audio data.

12. A system comprising:
a first microphone disposed on an in-ear audio device;
a second microphone disposed on an inner-lobe insert of the in-ear audio device;
at least one processor; and
at least one memory including instructions that, when executed by the at least one processor, cause the in-ear audio device to:
receive, from the first microphone, first audio data corresponding to a first representation of first audio;
receive, from the second microphone, second audio data corresponding to a second representation of the first audio;
generate reference audio data using at least a portion of the first audio data and at least a portion of the second audio data;
generate first output audio data by combining the first audio data with at least a portion of the second audio data; and
generate second output audio data by subtracting at least a portion of the reference audio data from the first output audio data.

13. The system of claim 12, wherein the at least one memory further includes instructions that, when executed by the at least one processor, further cause the in-ear audio device to:
receive, from a user device, second reference audio data corresponding to reference audio; and
generate, using a set of filter coefficients, modified reference audio data by changing a phase of the reference audio data; and
wherein the reference audio data is the modified reference audio.

14. The system of claim 12, wherein the instructions that cause the in-ear audio device to generate the reference audio data comprise instructions that, when executed by the at least one processor, further cause the in-ear audio device to subtract at least a portion of the first audio data from the second audio data.

15. The system of claim 12, further comprising a third microphone disposed on the in-ear audio device, wherein:
the at least one memory further includes instructions that, when executed by the at least one processor, further cause the in-ear audio device to receiving, from the third microphone, third audio data corresponding to a third representation of the first audio; and
the instructions that cause the in-ear audio device to generate the reference audio data comprise instructions that, when executed by the at least one processor, further cause the in-ear audio device to generate the reference audio data further using the third audio data.

16. The system of claim 15, wherein the instructions that cause the in-ear audio device to generate the reference audio data comprise instructions that, when executed by the at least one processor, further cause the in-ear audio device to subtract at least a portion of the first audio data and at least a portion of the third audio data from the second audio data.

17. The system of claim 15, wherein the at least one memory further includes instructions that, when executed by the at least one processor, further cause the in-ear audio device to:
generate, using a set of filter coefficients, modified third audio data by changing a phase of the third audio data; and
generate output audio data by adding the first audio data and the modified third audio data.

18. The system of claim 17, wherein the at least one memory further includes instructions that, when executed by the at least one processor, further cause the in-ear audio device to:
receive, from a second in-ear audio device, third output audio data;
generate, using a set of filter coefficients, modified third output audio data by changing a phase of the third output audio data; and
generate fourth output audio data by adding the output audio data and the modified third output audio data.

19. The system of claim 15, wherein the at least one memory further includes instructions that, when executed by the at least one processor, further cause the in-ear audio device to:
generate modified first audio data by changing a phase of the first audio data in accordance with a first transfer function defining a relationship between the first microphone and the third microphone; and
generate modified third audio data by changing a phase of the third audio data in accordance with a second transfer function defining a relationship between the second microphone and the second microphone,
wherein the instructions that cause the in-ear audio device to generate the reference audio data comprise instructions that, when executed by the at least one processor, further cause the in- ear audio device to subtract the modified first audio data and the modified third audio data from the second audio data.

* * * * *